United States Patent
Vallati

(10) Patent No.: US 11,703,451 B2
(45) Date of Patent: Jul. 18, 2023

(54) APPARATUS AND METHOD FOR INSPECTING TRANSPARENT CYLINDRICAL CONTAINERS CONTAINING MILKY PRODUCTS, IN PARTICULAR FOR MEDICAL APPLICATIONS

(71) Applicant: NUOVA OMPI S.R.L., Piombino Dese (IT)

(72) Inventor: Luca Vallati, Mira (IT)

(73) Assignee: NUOVA OMPI S.R.L., Piombino Dese (IT)

(*) Notice: Subject to any disclaimer, the term of this patent is extended or adjusted under 35 U.S.C. 154(b) by 54 days.

(21) Appl. No.: 17/540,469

(22) Filed: Dec. 2, 2021

(65) Prior Publication Data

US 2022/0178822 A1 Jun. 9, 2022

(30) Foreign Application Priority Data

Dec. 9, 2020 (IT) .................. 102020000030191

(51) Int. Cl.
 *G01N 21/51* (2006.01)
 *G01N 15/06* (2006.01)

(52) U.S. Cl.
 CPC ..... *G01N 21/51* (2013.01); *G01N 2015/0693* (2013.01)

(58) Field of Classification Search
 CPC .......... G01N 2015/0693; G01N 21/51; G01N 2021/8887; G01N 21/8806; G01N 21/8851; G01N 21/9027
 USPC .......... 356/339, 134, 239.1–239.8, 409–410, 356/243.2–243.8, 244–246
 See application file for complete search history.

(56) References Cited

U.S. PATENT DOCUMENTS

2008/0230720 A1 9/2008 Nielsen
2020/0408702 A1* 12/2020 Knuelle ............... G01N 21/956

FOREIGN PATENT DOCUMENTS

WO 2020/131666 A1 6/2020

OTHER PUBLICATIONS

Search Report for IT2020000030191 dated Aug. 23, 2021.

* cited by examiner

*Primary Examiner* — Tri T Ton
(74) *Attorney, Agent, or Firm* — ArentFox Schiff LLP; Michael Fainberg

(57) ABSTRACT

An apparatus for inspecting transparent cylindrical containers comprising a support and/or gripping device for a cylindrical container adapted to support and make it rotate about a vertical rotation axis, a video camera directed to capture images of a window of a side wall of the cylindrical container, a first collimated lighting device that illuminates said window, a second lighting device that illuminates said window and is arranged opposite the first lighting device in a symmetrical position with respect to the window, a control unit operationally connected to the support and/or gripping device, to the video camera and to said first and second lighting devices, and programmed to capture images of said window at constant angular intervals, alternately activating the first and second lighting devices for each angular range until a complete 360° rotation of the cylindrical container is made, and processing the images obtained.

9 Claims, 3 Drawing Sheets

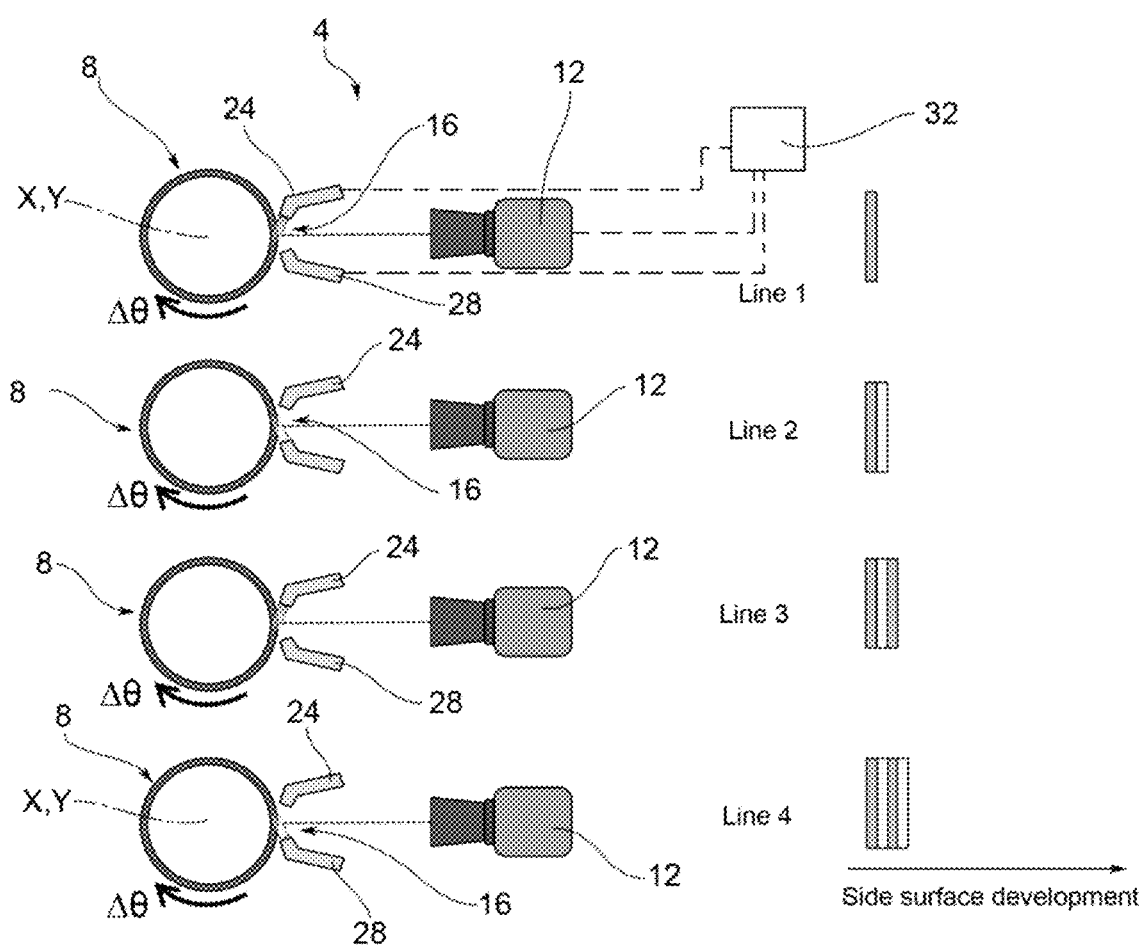
FIG.3b
FIG.3a
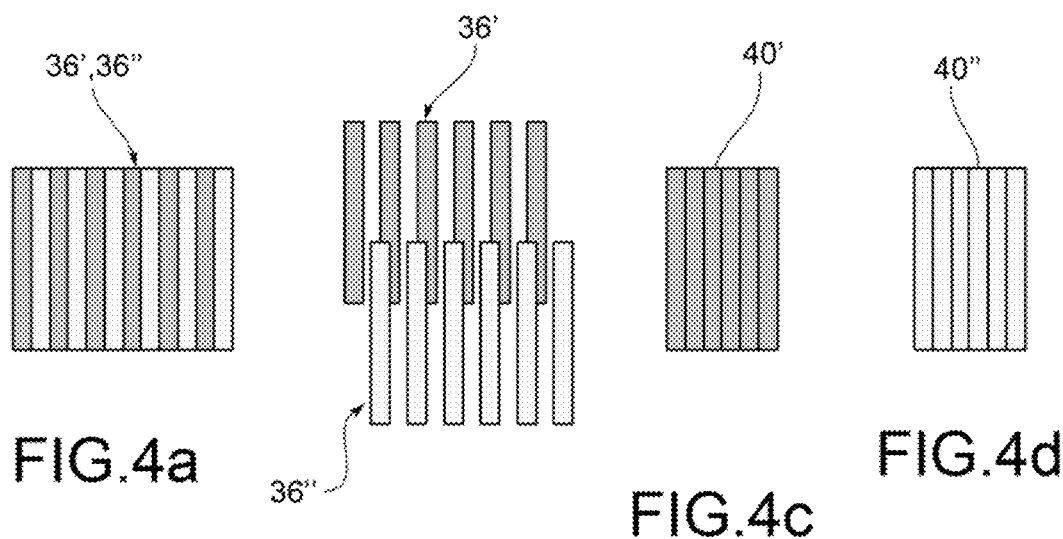
FIG.4a  FIG.4b  FIG.4c  FIG.4d

APPARATUS AND METHOD FOR INSPECTING TRANSPARENT CYLINDRICAL CONTAINERS CONTAINING MILKY PRODUCTS, IN PARTICULAR FOR MEDICAL APPLICATIONS

CROSS-REFERENCE TO RELATED APPLICATION

This application claims priority to Italian Patent Application No. 102020000030191 filed on Dec. 9, 2020, the entire contents of which is hereby incorporated in its entirety by reference.

FIELD OF THE INVENTION

This invention relates to an apparatus and method for inspecting transparent cylindrical containers containing milky products, in particular for medical applications.

PRIOR ART

As is well known, in the medical sector it is essential to analyze transparent containers of medical substances in order to detect the presence of any impurities inside said container. In the case of a positive result, the container will obviously have to be discarded because it is not acceptable that the medical substance could contain any kind of contamination.

The systems employed in the art are optical and make use of video cameras that scan each container in order to detect any contaminants. However, the known systems have some drawbacks.

In effect, the known optical systems, while being able to detect the presence of a contaminant/impurity are not able to reliably discriminate whether the location of said contaminants is internal or external to the container. Obviously in this case the container must be discarded only if the contaminant is internal, i.e., in contact with the medical substance contained therein.

Obviously, for safety reasons, the known systems are calibrated to be 'conservative,' resulting in a high rate of positive rejects. In order to remedy at least partially this drawback, the inspection times of the containers are extended, but, in this way, if on the one hand false rejects are reduced, on the other, the inspection times and costs increase in an unacceptable way.

It should be borne in mind that inspection times are a non-negligible cost factor since the batches to be inspected may comprise several tens of thousands of containers.

Therefore, the known solutions do not allow for a low rate of positive rejects and reduced inspection times to be obtained simultaneously.

SUMMARY OF THE INVENTION

Thus, there is a need to resolve the cited drawbacks and limitations in reference to the prior art.

This need is met by an apparatus for inspecting transparent cylindrical containers containing milky products, in particular for medical applications according to claim 1, and by a method according to claim 6.

BRIEF DESCRIPTION OF THE DRAWINGS

Further features and advantages of this invention will become more apparent from the following description of preferred and non-limiting embodiments thereof, in which:

FIG. 3a depicts schematic views from above of an inspection apparatus according to this invention, in successive inspection stages;

FIG. 3b depicts a development diagram of an image of the lateral surface of a container obtained following the corresponding inspection stages of FIG. 3a;

FIG. 4a depicts a first schematic view of processing of images captured by an inspection apparatus according to this invention;

FIG. 4b depicts a second schematic view of processing of images captured by an inspection apparatus according to this invention;

FIG. 4c depicts a third schematic view of processing of images captured by an inspection apparatus according to this invention;

FIG. 4d depicts a fourth schematic view of processing of images captured by an inspection apparatus according to this invention;

Figures 1A, 1B:
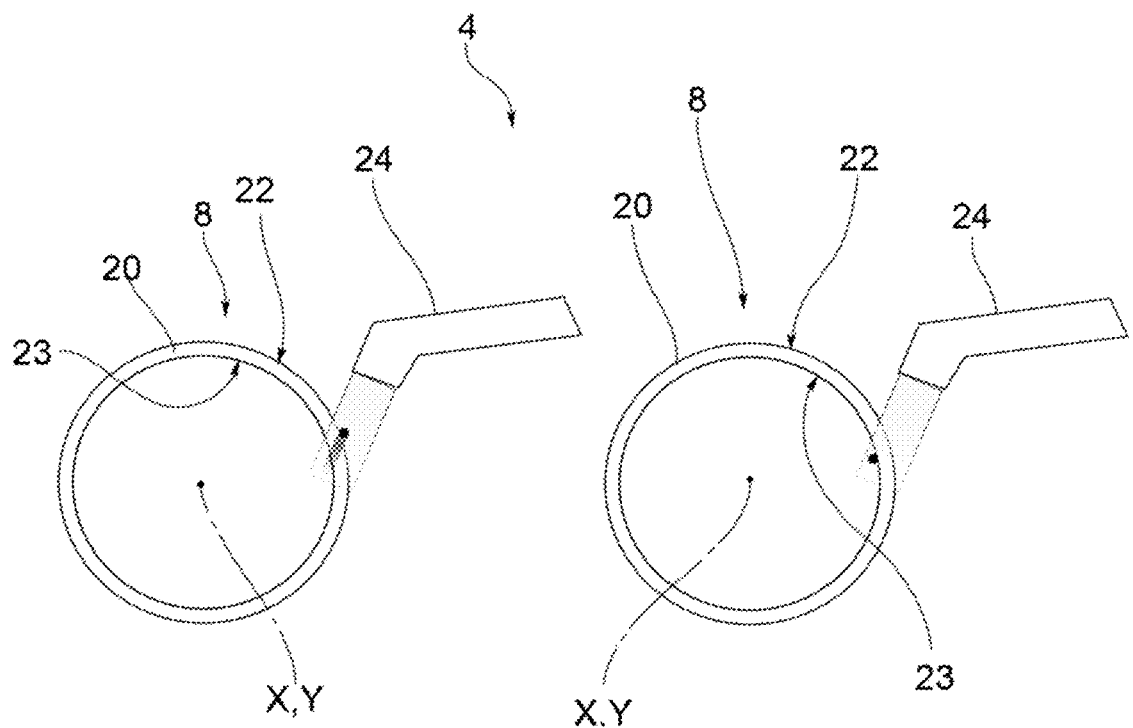
FIG. 1a depicts a first schematic view from above of an apparatus for inspecting transparent cylindrical containers containing milky products according to an embodiment of this invention.
FIG. 1b depicts a second schematic view from above of an apparatus for inspecting transparent cylindrical containers containing milky products according to an embodiment of this invention.

Elements or parts of elements common to the embodiments described hereinafter will be indicated with the same numerical references.

DETAILED DESCRIPTION

With reference to the aforementioned figures, 4 is used to globally indicate an apparatus for inspecting transparent cylindrical containers 8 containing milky products, in particular for medical applications.

It should be noted that the cylindrical containers 8 are transparent, so as to allow the substances, preferably milky, contained therein to be seen from the outside. It should be noted that a 'milky liquid' is a solution with a high turbidity. The turbidity is the ratio (measured with a nephelometer) between the light intensity diffused by the solution in the direction perpendicular to that of the incident light beam and the light intensity of said beam. Turbidity may also be defined in relation to optical transparency, i.e., as the ratio (measured with a turbidimeter) between the intensity of the light transmitted in the same direction as the incident light and the intensity of the incident light.

Therefore, said cylindrical containers 8 are preferably made of glass or plastic, such as plexiglass.

Furthermore, the cylindrical containers 8 have an axis of axial symmetry X-X; in other words, they are rotational solids about said axis of axial symmetry X-X.

Said inspection apparatus 4 comprises a support and/or gripping device (not shown) for a cylindrical container 8 adapted to support it and provided with motor means for rotating it about a vertical rotation axis Y-Y, coinciding with the axis of cylindrical axial-symmetry X-X of said cylindrical container 8.

For the purposes of this invention, it is possible to use a plurality of support and/or gripping devices for the cylindrical containers 8; care must be taken to ensure that said support and/or gripping devices do not prevent the viewing and therefore verification of any impurities on the cylindrical container 8. For this purpose, support and gripping devices are preferred which grip or otherwise draw the containers in rotation by their support base. There are a multitude of gripping devices/methodologies suitable for the purpose. For example, it is possible to grip the bottle bottom-head or use clamps at the neck of said bottle, etc.). The important thing is that these devices rotate the bottle about the main axis thereof.

The apparatus 4 further comprises a video camera 12 directed so as to frame and capture images, in the form of pixels, of a window 16 of a side wall 20 of the cylindrical container 8. Obviously, due to the fact that the cylindrical container 8 is transparent, the video camera 12 is able to capture images not only of the side wall 20 of the cylindrical container 8 but also of its contents (preferably milky liquid). Indeed, the object of this invention is to detect the presence of impurities and then to distinguish whether such possible impurities are on the outside, i.e., on an external surface 22 of the side wall 20, or on the inside, i.e., on an internal surface 23 of the side wall 20 of the cylindrical container 8. In the event that the impurity is on the internal surface 23, then it will be in direct contact with the liquid contained in the cylindrical container 8 which will need to be discarded.

The apparatus 4 further comprises a first lighting device 24 collimated and oriented to illuminate said window 16, and a second lighting device 28 collimated and oriented to illuminate said window 16.

The second lighting device 28 is arranged opposite to the first lighting device 24, in a position symmetrical with respect to the window 16.

The apparatus 4 further comprises a control unit 32 operatively connected to the support and/or gripping device, the video camera 12, and said first and second lighting devices 24, 28, and programmed to:
  capture first and second partial images 36', 36" of said window 16 at constant angular intervals, alternately activating the first lighting device 24 and the second lighting device 28, for each angular interval, until a complete rotation of 360° of the cylindrical container is performed (FIG. 3*a*-3*b*). In particular, the video camera 12 captures the first partial images 36' during the activation of the first lighting device 24 and captures the second partial images 36" during the activation of the second lighting device 28.

Thus, the control unit 32 is programmed to associate, without interruption, the individual partial images 36', 36" obtained by alternately activating the first lighting device 24 so as to obtain a first aggregate image 40' of the cylindrical container 8, and the second lighting device 28, so as to obtain a second aggregate image 40", of the cylindrical container 8 (FIG. 4*c*-4*d*).

Thus, the control unit proceeds to the step of identifying, within each aggregate image, the presence of any irregular pixels 48 having chromatic differences corresponding to contaminants.

In the case wherein at least one of said irregular pixels 48 is identified, a control image 52 derived from the difference between the first aggregate image 40' and the second aggregate image 40" is made, and the position of the contaminant with respect to the side wall 20, of the cylindrical container 8 is cataloged according to said control image 52.

Figure 5:
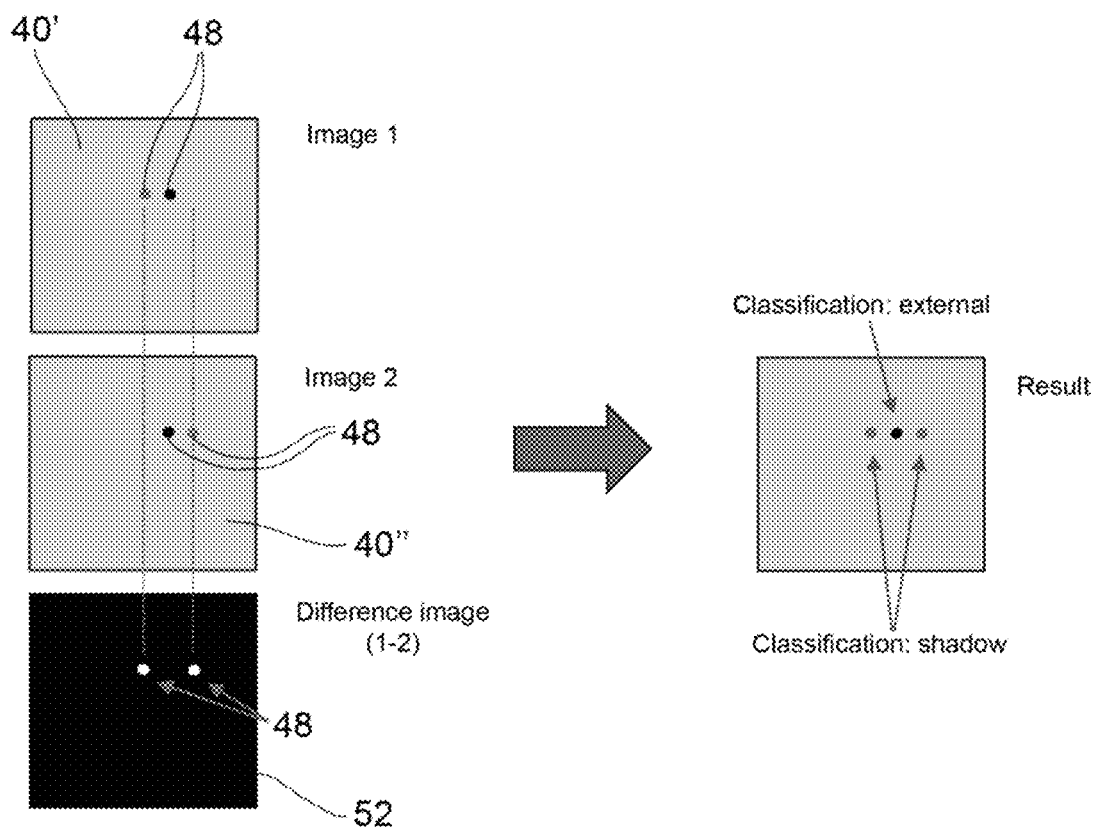
FIG. 5 depicts a graphical elaboration of the identification of an external contaminant with respect to the container analyzed according to the apparatus and inspection method of this invention.
Figure 6:
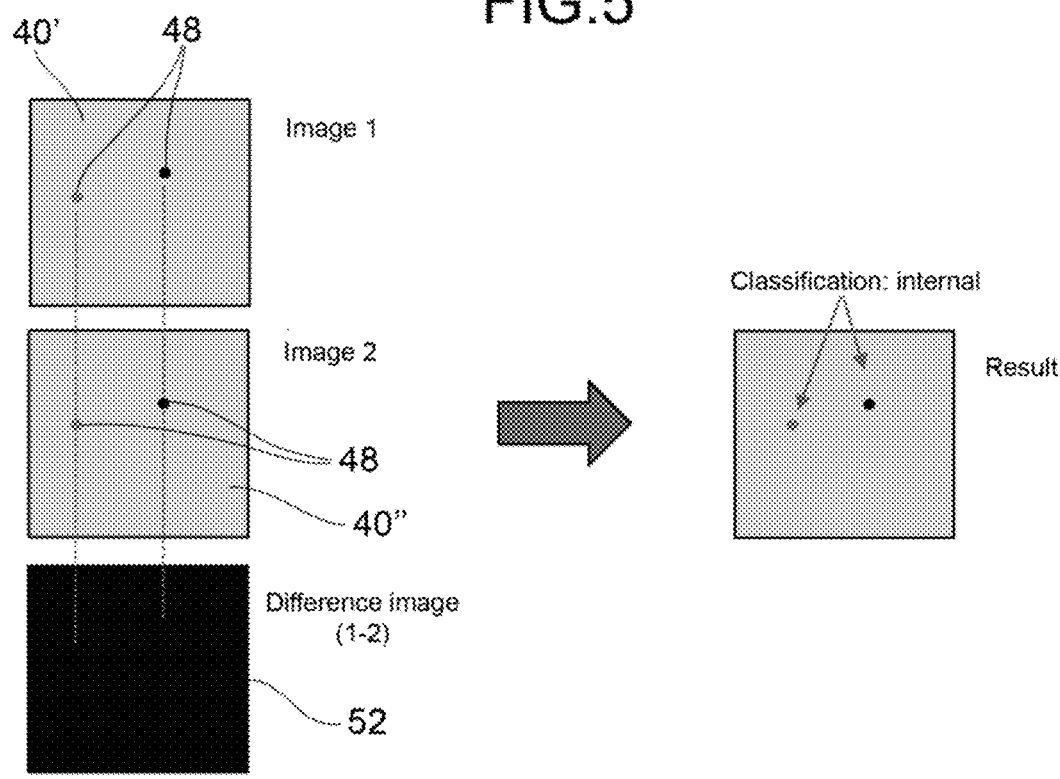
FIG. 6 depicts a graphical elaboration of the identification of an internal contaminant with respect to the container analyzed according to the apparatus and inspection method of this invention.

In particular, for the purposes of identifying said position, according to a possible embodiment, the control unit 32 is programmed to:
  categorize a contaminant as external to the side wall 20 of the cylindrical container 8, if said control image 52 comprises at least one irregular pixel 48 (FIG. 5),
  categorize a contaminant as internal to the side wall 20 of the cylindrical container 8, if said control image 52 does not comprise at least one irregular pixel 48 (FIG. 6).

Obviously, in the case wherein the contaminant is cataloged as being inside the cylindrical container 8, said container will be discarded.

As may be understood, for the purposes of proper detection and cataloging of contaminants, precise shots of the window 16 must be taken by alternately activating the first and second lighting devices 24, 28.

For this purpose, according to a possible embodiment, the support and/or gripping device is provided with a rotary encoder for measuring the rotation of the cylindrical container 8; preferably said rotary encoder is operatively connected to the control unit 32 for alternately activating said first and second lighting devices 24, 28.

The angular intervals with which the linear video camera scans the extension of the container 8 depend on the resolution that one wishes to apply in the direction of extension of said container. A value for these angular ranges may be, for example, 0.044 degrees, obtained by dividing the 360° turn angle of the container by 8192 encoder pulses (360°/8192).

Regular angular intervals are thus, by way of example, angular intervals of 0.05 sexagesimal degrees.

According to a possible embodiment, in order not to incur a loss of resolution, the acquisition of the images of the side wall 20 and in particular the window 16 of the cylindrical container 8 is oversampled by a factor of 2, doubling the resolution in the direction of the extension of the side surface: in this way, two final images at the correct resolution will be obtained.

The operation of the inspection apparatus according to this invention will now be described.

Figures 2A, 2B:
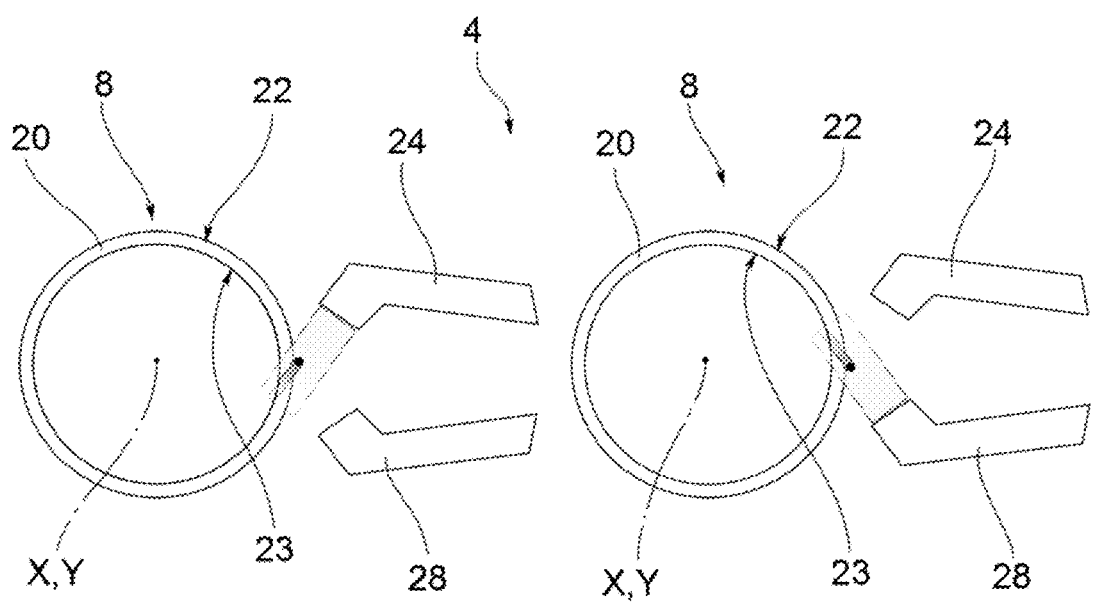
FIG. 2a depicts a third schematic view from above of an apparatus for inspecting transparent cylindrical containers containing milky products according to an embodiment of this invention.
FIG. 2b depicts a fourth schematic view from above of an apparatus for inspecting transparent cylindrical containers containing milky products according to an embodiment of this invention.

In particular, the principle on which this invention is based starts from the assumption that a contaminant attached to the external surface 22 of the side wall 20, when illuminated by a collimated and non-orthogonally incident light, will cast a shadow on the milky liquid given its distance from said liquid equal to the thickness of the (transparent) side wall of the container 8 (FIG. 1*a*-1*b*). On the other hand, an object or contaminant, attached to the internal surface 23 of the cylindrical container 8, will be in contact with said liquid and consequently cannot by construction cast any shadow on the liquid with which it is in direct contact (FIG. 2*a*-2*b*).

The detection of the projected shadow of a contaminant makes it possible to determine whether the contaminant is inside or outside the cylindrical container 8. The problem therefore becomes one of discriminating a shadow of an object, from a thin and poorly covering contaminant. For this reason, stereoscopic lighting was introduced into the process.

An object resulting on the external surface 22 of the cylindrical container 8, when illuminated by two collimated illuminators, i.e., the first lighting device 24 and the second lighting device 28, the light of which incises at symmetrical angles the external surface 22, will cast two shadows in opposite directions, which are symmetrical with respect to the position thereof.

During the rotation of the cylindrical container 8 (FIG. 3a-3b), the video camera 12 captures lines at constant angular intervals dθ, for example, through the use of a rotary encoder connected to the motor that sets the cylindrical container 8 in rotation. In this way, the video camera 12 will produce a continuous extension of the side surface 20 of the cylindrical container 8.

In the acquisition of the line, the first and second symmetrical lighting devices 24, 28 will be activated in an alternating mode. It then happens that the first lighting device 24 is only activated during the acquisition of the even-numbered lines while the second lighting device 28 remains off. The sum of said even-numbered lines, i.e., the sum of the first partial images 36' captured during the activation of the first lighting device 24, constitutes the first aggregate image 40' (FIG. 4a-4d).

Said first aggregate image 40' will therefore be the extension of the entire side wall 20 of the cylindrical container 8 obtained by activating only the first lighting device 24.

Symmetrically, the second lighting device 28 will only be activated during the acquisition of the odd-numbered lines while the first lighting device 24 remains off.

The sum of said odd lines, i.e., the sum of the second partial images 36" captured during the activation of the second lighting device 28, constitutes the second aggregate image 40" (FIG. 4a-4d).

Said first aggregate image 40" will therefore be the extension of the entire side wall 20 of the cylindrical container 8 obtained by activating only the first lighting device 28.

The first aggregate image 40' and the second aggregate image 40" will have a number of lines that is half the number of lines with respect to the overall captured image.

As shown, in order not to be subject to a loss of resolution, the captured image will be oversampled by a factor of 2, doubling the resolution in the direction of the extension of the side wall 20. In this way, two final images at the correct resolution will be obtained.

At this point, the so-called control image 52 is calculated as the difference between the first aggregate image 40' and the second aggregate image 40" and only the irregular pixels 48 are highlighted, i.e., pixels where the grayscale has changed. This will be due solely to shadows occurring at different points in the first aggregate image 40' with respect to the second aggregate image 40". The contaminant, if present, will not show up in a different location, only its shadow will vary. We will therefore know that, in the presence of said difference, the object that generated them will be external and comprised between the two shadows (FIG. 5). The object will also be at a precise distance from them, which will be proportional to the thickness of the side wall 20 of the cylindrical container 8 and to the angle of the incident light. This object will in the end be excluded from the contaminants deemed internal to the bottle.

As may be appreciated from that which has been described, the apparatus and the inspection method according to the invention make it possible to overcome the drawbacks presented in the prior art.

In particular, this invention enables the detection of contaminants present inside the container (unacceptable for testing purposes), distinguishing them from contaminants present outside the container (instead considered acceptable).

This implies a drastic lowering of false rejection due to the detection of dirt, fibers, and other objects that are not in contact with the pharmaceutical product as they are found outside the containers.

The "spin & stop" approach, typical of particle analysis for transparent water-like products, is not applicable as it does not allow centrifuging and keeps the contaminant on the external wall, which, if it were moved away from the wall even by a few tenths of a millimeter, would not be visible. A cosmetic approach, i.e., with continuous rotation and rotational image acquisition, makes the contaminant contained detectable.

This process, being able to differentiate the external or internal position of the contaminant, allows containers with milky liquids to be analyzed with a cosmetic approach, drastically decreasing the false rejection due to external dirt.

A person skilled in the art, for the purpose of meeting contingent and specific needs, may make numerous modifications and variations to the apparatuses and inspection methods described above, all of which, however, are contained within the scope of the invention as defined by the following claims.

The invention claimed is:

1. Apparatus for inspecting transparent cylindrical containers containing milky products, in particular for medical applications, comprising:
   a support and gripping device for a cylindrical container, suitable to support it and provided with means for making it rotate about a vertical rotation axis, coincident with an axis of cylindrical axial-symmetry of said cylindrical container,
   a video camera directed so as to frame and capture images, in the form of pixels, of a window of a side wall of the cylindrical container,
   a first collimated lighting device having a first light source directed so as to illuminate said window,
   a second lighting device having a second light source collimated and oriented so as to illuminate said window, placed opposite the first lighting device, in a symmetrical position with respect to the window,
   a controller operatively connected to the support and gripping device, the video camera and to said first and second lighting devices, and programmed to:
   capture first and second partial images of said window at constant angular intervals, alternatively activating the first and second lighting devices, for each angular interval, until a complete rotation of 360° of the cylindrical container is performed,
   associate, without interruption, the first and second partial images obtained by alternatively activating the first lighting device, so as to obtain a first aggregate image of the cylindrical container, and of the second lighting device, so as to obtain a second aggregate image of the cylindrical container,
   identify, within each aggregate image, the presence of possible irregular pixels having chromatic differences corresponding to contaminants,
   realize, in case of identification of at least one of said irregular pixels, a control image derived from the difference between said first and second aggregate images and catalogue, according to said control image, the position of the contaminant with respect to the side wall of the cylindrical container.

2. The apparatus according to claim 1, wherein the controller is programmed to:
categorize a contaminant as external to the side wall of the cylindrical container, if said control image comprises at least one irregular pixel,
categorize a contaminant as internal to the side wall of the cylindrical container, if said control image does not comprise at least one irregular pixel.

3. The apparatus according to claim 1, wherein the support and gripping device is provided with a rotary encoder to measure the rotation of the cylindrical container, said rotary encoder being operatively connected to the controller to alternately activate said first lighting device and second lighting device.

4. The apparatus according to claim 1, wherein, in order not to incur a loss of resolution, the acquisition of the images of the side wall of the cylindrical container is oversampled by a factor of 2, doubling the resolution in the direction of the extension of the surface.

5. The apparatus according to claim 1, wherein said regular angular intervals are angular intervals of 0.05 sexagesimal degrees.

6. A method for inspecting transparent cylindrical containers containing milky products, particularly for medical applications, comprising the steps of:
providing a transparent cylindrical container containing a milky product, supported so as to rotate around a vertical axis of rotation, coinciding with an axis of axial symmetry of the container itself,
providing a video camera directed so as to frame and capture images, in the form of pixels, of a window of a side wall of said cylindrical container,
providing a first collimated lighting device having a first light source directed so as to illuminate said window,
providing a second lighting device having a second light source collimated and oriented so as to illuminate said window, placed opposite the first lighting device, in a symmetrical position with respect to the window,
capturing first and second partial images of said window at constant angular intervals, alternatively activating the first and second lighting device, for each angular interval, until a complete rotation of 360° of the cylindrical container is performed,
associating, without interruption, the individual partial images obtained by alternatively activating the first lighting device, so as to obtain a first aggregate image of the cylindrical container, and of the second lighting device, so as to obtain a second aggregate image of the cylindrical container,
identifying, within each aggregate image, the presence of possible irregular pixels having chromatic differences corresponding to contaminants,
realizing, in case of identification of at least one of said irregular pixels, a control image derived from the difference between said first aggregate image and second aggregate image and cataloguing, according to said control image, the position of the contaminant with respect to the side wall of the cylindrical container.

7. Method according to claim 6, comprising the steps of:
categorizing a contaminant as external to the side wall of the cylindrical container, if said control image comprises at least one irregular pixel,
categorizing a contaminant as internal to the side wall of the cylindrical container, if said control image does not comprise irregular pixels.

8. The method according to claim 6, comprising the step of oversampling by a factor of 2 the acquisition of the images of the side wall of the cylindrical container, doubling the resolution in the direction of the extension of the surface.

9. The method according to claim 6, wherein said regular angular intervals are angular intervals of 0.05 sexagesimal degrees.

* * * * *